Dec. 15, 1959 J. L. BOYER ET AL 2,917,686
SEMICONDUCTOR RECTIFIER DEVICE
Filed Aug. 19, 1957
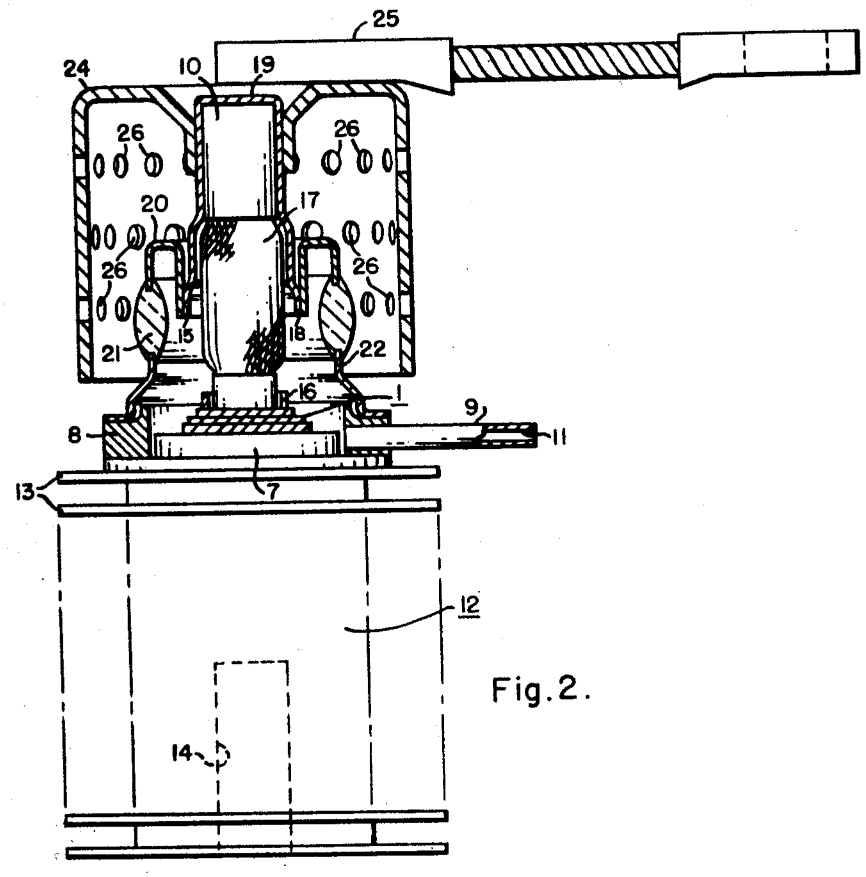
Fig.2.
Fig.I.
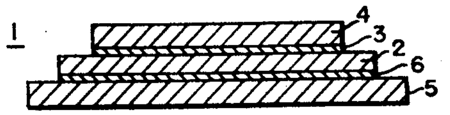
WITNESSES
Edwin E. Bassler
James F. Young
INVENTORS
John L. Boyer, August P. Colaiaco &
Herbert C. McWilliams
BY
F. E. Browder
ATTORNEY United States Patent Office 2,917,686

Patented Dec. 15, 1959

2,917,686

SEMICONDUCTOR RECTIFIER DEVICE

John L. Boyer and August P. Colaiaco, Forest Hills, and Herbert C. McWilliams, Monroeville, Pa., assignors to Westinghouse Electric Corporation, East Pittsburgh, Pa., a corporation of Pennsylvania Application August 19, 1957, Serial No. 679,030

6 Claims. (Cl. 317—234)

The present invention relates to semiconductor rectifier devices, and more particularly to a hermetically sealed power rectifier assembly.

Semiconductor materials suitable for use in rectifiers may be made to be of either of two conductivity types by the addition of minute quantities of impurities, consisting of donor elements or acceptor elements, to the pure material. The addition of a minute quantity of a donor element results in the precence of an excess of electrons in the material which are available for conduction. Such material is commonly referred to as N-type material. Conversely, the addition of minute quantities of an acceptor elements to the pure material produces a deficiency of electrons in the crystal structure, resulting in holes in the valence bonds between adjacent atoms. Because of the deficiency of electrons, a P-type material results. When a region of N-type material adjoins a region of P-type material, a net transfer of charge occurs creating an electrostatic potential barrier with resultant rectifying properties at the junction between the two types of materials. The junction is characterized by low impedance to current flow from the P-type to the N-type material but very high impedance to current flow from the N-type to the P-type material.

The P–N junction rectifiers described above are capable of carrying very high current densities in the forward direction with a low forward resistance drop. When an inverse voltage is applied to such a rectifier, only an extremely small amount of inverse current will flow because of the high inverse resistance of the rectifier. The result is that these devices are suitable for use as power rectifiers if certain provisions are made.

To permit a P–N junction rectifier to carry high load currents, means must be provided for very effective transfer of heat from the semiconductor material because the inverse impedance of the material will rapidly decrease with excessive temperature rise. A large inverse current flow due to the material being too hot will result in further heating and damage to the rectifier as well as reducing the efficiency to a prohibitive point. Since the semiconductor body itself is of very small physical size, a relatively large amount of heat is generated in a small mass, so that the temperature will easily exceed the permissible limit unless very effective cooling means are provided. It can, therefore, be seen that in order to obtain high current ratings with good efficiencies and long life, the rectifier must have the best possible cooling so as not to exceed the maximum permissible temperature.

Semiconductor devices are very sensive to the presence of foreign impurities and to moisture, which will adversely affect the characteristics and life of the device. Therefore, the rectifier must be adequately sealed to protect it from moisture and other impurities. In many types of construction which have been proposed, the sealing operation itself introduces the very impurities sought to be excluded from the semiconductor material.

The semiconductor materials used in these rectifiers are brittle, and the thin wafers necessary for minimum forward resistance are inherently very fragile. The housing or container containing the wafer must be designed so that the fragile semiconductor material is not subjected to damaging mechanical forces, either from thermal expansion or from outside sources. Of course, the housing itself must also be capable of withstanding damaging mechanical forces to insure a continued good hermetic seal.

It will be seen, therefore, that the design of a practical semiconductor power rectifier involves numerous difficult problems because of the necessity of providing protection against moisture and other impurities and of providing that protection without introducing impurities in the sealing process. Adequate protection against mechanical stresses on the semiconductor material and the housing and adequate cooling means are also necessary.

An object of our invention is to provide an improved semiconductor rectifier assembly which allows encapsulation of the diode in one operation thereby reducing the likelihood of introducing contaminants into the capsule.

Another object of our invention is to provide an improved semiconductor rectifier assembly which allows use of either air cooled or water cooled heat exchange means.

Another object of our invention is to provide the diode wafer with adequate protection from mechanical forces and to provide sufficient flexibilty to prevent damage by mechanical stresses.

Another object of our invention is to provide a rectifier assembly which can be operated over a wide range of temperature by matching where possible the coefficients of thermal expansion of materials used and providing flexibility to parts which have different coefficients of thermal expansion.

Another object of our invention is to provide means for directing coolant air flow over the main cooling fins of the semiconductor rectifier assembly.

Other objects and advantages of the invention will be apparent from the following detailed description, taken in connection with the accompanying drawings, in which:

Figure 1 is a transverse sectional view of a typical semiconductor rectifier cell or diode; and Fig. 2 is a view in elevation, and partly in vertical section, of a rectifier assembly embodying our invention.

The present invention provides a hermetically sealed power rectifier assembly in which any suitable type of semiconductor diode may be used. By way of illustration, Fig. 1 shows a typical semiconductor rectifier cell which may be used in such an assembly. The thickness of the various layers has been greatly exaggerated in the drawing for clarity of illustration.

The heart of the semiconductor device is the rectifier cell 1 which is a sandwich of five layers of material fused together. The center or rectifying layer 2 of the cell 1 is a slice of silicon or germanium from a single crystal, preferably in the form of a thin wafer to provide the necessary area for high current ratings with low resistance in the forward direction. This center or rectifying layer 2 contains a small amount of impurity which makes the rectifying layer 2 initially of N-type material having an excess of electrons. An acceptor material 3, preferably aluminum if the semi-conductor is silicon and indium if the semiconductor is germanium, alloys with the rectifying layer 2 and diffuses into it. Thus, the acceptor material 3 on the top surface of the rectifying layer 2 forms a P–N junction by diffusing into the rectifying layer 2, which is of the N-type, thereby changing the upper surface of the rectifying layer 2 from N to P-type. In such a manner a P–N junction is formed. Additionally, the acceptor material 3 is also utilized to bond the rectifying layer 2 to an upper support plate 4. The other side of the rectifying layer 2 is soldered to the lower support plate 5 with an ohmic contact 6. The solder may be a silver alloy if the semiconductor material is silicon and may be pure tin if the semiconductor material is germanium.

The upper support plate 4 and the lower support plate 5 provide strong stable support for the other layers within the sandwich, as well as providing good surfaces for the attaching of electrical connections. These plates are preferably made of tungsten or molybdenum because such materials have good thermal conductivity for effective heat transfer from the semiconductor material, and have coefficients of thermal expansion close to those of both silicon and germanium so that no substantial stresses are imposed on the semiconductor material by differential expansion when the diode is heated either during manufacture or in service. It will be understood that any type of semiconductor rectifier cell may be used in the rectifier assembly to be described below, and that the particular cell 1 described in detail above is only illustrative.

A semiconductor rectifier cell, such as the cell 1 described above, has very desirable characteristics and can handle large amounts of power. As previously explained, however, for practical use, such a rectifier cell must be provided with a suitable support and enclosing structure which protects the cell from moisture and other impurities and protects it from the mechanical stresses which might damage the fragile semiconductor material. Very effective cooling means must be provided to permit high current ratings. The present invention provides a structure which fully meets these requirements.

As shown in Fig. 2, the rectifier cell 1 is mounted on a flat member 7 of any suitable material, preferably copper, and joined thereto by a suitable solder, preferably 95% lead and 5% indium, for good electrical contact and good heat transfer from the rectifier cell 1 to the member 7. The member 7 is disposed within a hollow, substantially cup-shaped base 8 and is preferably integral therewith. The base 8 has a tubular projection 9 with a passageway 11 for evacuation and removal of all traces of impurities or contaminants which would have an adverse effect on the rectifier cell 1 if allowed to remain within the sealed enclosure. The base 8 is attached to a heat dissipating means herein shown as a relatively massive cylindrical portion 12 with radial fins 13 formed thereon. The junction between the base 8 and the cylindrical portion 12 is preferably made with 100% tin solder although any adequate means for attachment can be used. A tapped hole 14 may be provided at the bottom of the cylindrical portion 12 for mounting the device on a bus bar or other conductor or support.

On the other side of the rectifier cell 1 a conductor 17 is attached in an enclosure which may be formed by a ring 16 attached to the upper support plate 4. A suitable solder such as 95% lead and 5% indium may be used. The conductor 17 is shown as being a heavy, multistrand, twisted copper cable, which is capable of carrying currents in the order of hundreds of amperes. Such a cable is sufficiently flexible to prevent mechanical stresses on the semiconductor material of the rectifier cell 1 which could arise during the handling of the rectifier or while mounting it to an external bus bar, or due to difference in the thermal expansions of the glass seal and the copper conductor.

The assembly, as described above, is now ready for encapsulation. A top cup 19, which may be spun from soft oxygen-free copper, is attached with a vacuum tight seal, preferably by silver brazing, to a first cylindrical sleeve member 20 which is made of an alloy capable of forming a permanent air-tight seal with glass, such as the iron-nickel-cobalt known as Kovar. The first cylindrical sleeve member 20 is fused to the glass tube 21 forming a permanent hermetic seal therewith. A second cylindrical sleeve member 22, also preferably of an alloy capable of forming a permanent air-tight seal with glass, is fused to the opposite end of the glass tube 21. This copper-alloy-glass assembly is then inserted over the end of the multistrand twisted conductor 17 so as to form a capsule for enclosing the conductor 17 as well as the rectifier cell 1 mounted on the base 8. In a single operation the encapsulation of the rectifier cell 1 is accomplished by projection welding the second cylindrical sleeve member 22 to the base 8. This welding is preferably done in a controlled atmosphere so that either dry air or an inert gas can be left in the enclosure. In such a manner, our invention makes it possible for the rectifier cell 1 and its flexible conductor 17 to be joined to the copper-glass-Kovar assembly in one welding operation. Any harmful impurities, moisture or foreign gases can be withdrawn by means of the passageway 11 in the base 8. If desired, the capsule can be entirely or partially evacuated or filled with an inert gas, and thereafter completely sealed by effectively closing passageway 11.

The top cup 19 is crushed against a copper band 10 on the upper end of conductor 17 with sufficient force to form a cold weld between the two similar pieces of metal, thus permanently connecting the top cup 19 to the conductor 17. It will be apparent that other suitable means for connecting the top cup 19 to the conductor 17 might be utilized. A generally cylindrical radiator 24 is then coxially mounted on the reduced diameter of the top cup 19 and attached thereto in any suitable manner, preferably by 100% tin solder. An external flexible lead 25 can be soldered to the radiator 24 before or after the radiator is soldered to the copper top cup 19.

It should be noted that the first cylindrical member 20 has a reentrant portion 18 to which the top cup 19 is secured, thus forming a hairpin type connection. This particular attachment of joint 15 has sufficient flexibility to allow the cold welding of the cup 19 to the top of the flexible conductor 17 without causing leaks in the seals of the capsule. This flexible joint 15 will also relieve strains on the vacuum tight seals during handling and mounting of the rectifier device.

Referring to the radiator 24 it can be seen to have holes or slots 26 therein, thereby allowing air to circulate through the radiator to cool the top of the flexible conductor 17 but also allowing the radiator to provide adequate resistance to such air flow so that most of the air blown over the rectifier assembly will be directed over the main cooling fins 13 at the bottom of the semiconductor device. The cylindrical radiator 24 also extends down over the seals far enough to protect the seals from mechanical damage.

It will now be apparent that a sealed rectifier construction has been provided in which the rectifier cell 1 is completely enclosed in a hermetically sealed container which protects it against moisture and other foreign impurities. The flexible conductor 17 prevents any substantial mechanical stresses from being applied to the rectifier cell 1 from the handling of the device or mounting it to external bus bars or from stress due to the difference in thermal expansion of the hermetical seal and the copper conductor. Thus, it can be seen that the rectifier cell 1, rigidly supported by the flat cylindrical member 7 and the cup-shaped base 8 on one side and attached to the flexible conductor 17 on the other side, is well protected from mechanical stresses. The hairpin-like flexible joints 15 between the first cylindrical sleeve member 20 and the top cup 19 allows the cold crushing of the top cup 19 to the top of the flexible conductor 17 as well as relieving any further mechanical stresses to which the capsule may be subjected. The device is completely sealed in one welding operation which can be accomplished in a controlled atmosphere, thereby excluding impurities. The reduction in manufacturing time and number of rejections during the manufacture of such a semiconductor rectifier device is readily apparent.

Our invention has two large heat transfer areas for absorption by conduction of the excessive heat generated within the rectifier cell 1; namely, the massive cylindrical portion 12 underneath the rectifier cell 1 and the generally cylindrical radiator 24 above the rectifier cell 1 which also dissipates any heat tending to flow through the conductor 25 from an external bus bar. The cylindrical radiator 24 provides an adequate cooling of the capsule structure itself and forces the remainder of the coolant air blown across the semiconductor rectifier device to be directed to the fins 13 insuring adequate heat transfer in keeping with the minimum temperature limit of the rectifying layer 2.

It is now apparent that our invention provides an improved semiconductor rectifier assembly which protects the rectifying cell against moisture and foreign impurities, against mechanical stresses, and against excessive temperature rise.

A preferred embodiment of the invention has been shown and described for the purpose of illustration, but it will be apparent that various modifications can be made. Thus, an air cooled construction has been shown but it will be equally obvious that the base 8 of the capsule containing the rectifier cell 1 could be water cooled by merely attaching a water cooled heat exchange means thereto. Similarly, various other modifications and embodiments of the invention will be apparent to those skilled in the art, and it is understood that all such embodiments and modifications are within the scope of the invention.

We claim as our invention:

1. A rectifier device comprising a shallow substantially cup-shaped base, a semiconductor rectifier cell disposed with said base and having one side attached to the base, a flexible conductor attached to the other side of the rectifier cell, a top cup attached to and enclosing the opposite end of the flexible conductor, an insulating closure means joined to the top cup and to the base with vacuum tight seals, said insulating closure means being joined to said top cup by means of a flexible connection and means for dissipating heat from the semiconductor rectifier cell.

2. A rectifier device comprising a shallow substantially cup-shaped base, a semiconductor rectifier cell disposed within said base and having one side attached to the base, a flexible conductor attached to the other side of the rectifier cell, a top cup enclosing the opposite end of the flexible conductor, an insulating closure means hermetically joined to the top cup and to the base, said closure means being flexibly joined to the top cup.

3. A rectifier device comprising a shallow substantially cup-shaped base, a semiconductor rectifier cell disposed within said base and having one side attached to the base, a flexible conductor attached to the other side of the rectifier cell, a top cup enclosing and attached to the opposite end of the flexible conductor, an insulating closure means hermetically joined to the top cup and to the base, said closure means being flexibly joined to the top cup, a heat dissipating member attached to said base, and a generally cylindrical radiator coaxially mounted on said top cup.

4. A rectifier device comprising a shallow substantially cup-shaped base, a semiconductor rectifier cell disposed within said base and having one side attached to the base, a flexible conductor attached to the other side of the rectifier cell, a top cup enclosing the opposite end of the flexible conductor, an insulating closure means hermetically joined to the top cup and to the base, said closure means being flexibly joined to the top cup, a heat dissipating member attached to said base, a generally cylindrical radiator coaxially mounted on said top cup, said radiator having slots therethrough and being adapted to direct air in heat exchange relation with said heat dissipating member, and an external flexible lead attached to said radiator.

5. A rectifier device comprising a shallow substantially cup-shaped base, a semiconductor rectifier cell disposed within said base and having one side attached to the base, a flexible conductor attached to the other side of the rectifier cell, a top cup enclosing the opposite end of the flexible conductor, an insulating closure means hermetically joined to the top cup and to the base, said closure means being flexibly joined to the top cup, a heat dissipating member attached to said base, and a generally cylindrical radiator coaxially mounted on said top cup, said radiator extending over the insulating closure means thereby protecting the closure means from mechanical damage.

6. A rectifier device comprising a shallow substantially cup-shaped base member, a semiconductor rectifier cell disposed within said base member and having one side attached to said base member, a flexible conductor having one end attached to the other side of said rectifier cell, a top member attached to the opposite end of said flexible conductor, an insulating member, means hermetically connecting one edge of said insulating member to said base member, a metallic member hermetically joined to the other edge of said insulating member, said metallic member having a re-entrant portion, and means hermetically joining said re-entrant portion of said metallic member to said top member to provide a resilient joint between said metallic member and said top member.

References Cited in the file of this patent

UNITED STATES PATENTS

| | | |
|---|---|---|
| 2,763,822 | Frola et al. | Sept. 18, 1956 |
| 2,776,920 | Dunlap | Jan. 8, 1957 |
| 2,806,187 | Boyer et al. | Sept. 10, 1957 |
| 2,827,597 | Lidow | Mar. 18, 1958 |
| 2,861,226 | Lootens | Nov. 18, 1958 |
| 2,864,980 | Mueller et al. | Dec. 16, 1958 |
| 2,866,928 | Blundell | Dec. 30, 1958 |